(12) United States Patent
Song et al.

(10) Patent No.: US 9,544,718 B2
(45) Date of Patent: Jan. 10, 2017

(54) METHOD AND APPARATUS FOR TRANSMITTING AND RECEIVING AUDIO STREAM IN WIRELESS COMMUNICATION SYSTEM

(71) Applicant: LG ELECTRONICS INC., Seoul (KR)

(72) Inventors: Jonghun Song, Seoul (KR); Minsoo Lee, Seoul (KR); Younghwan Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/851,175

(22) Filed: Sep. 11, 2015

(65) Prior Publication Data

US 2016/0080896 A1    Mar. 17, 2016

Related U.S. Application Data

(60) Provisional application No. 62/048,811, filed on Sep. 11, 2014.

(51) Int. Cl.
*H04W 4/00* (2009.01)
*H04L 29/06* (2006.01)

(52) U.S. Cl.
CPC ........ *H04W 4/008* (2013.01); *H04L 29/06476* (2013.01)

(58) Field of Classification Search
CPC ..................................................... H04W 4/008
See application file for complete search history.

(56) References Cited

U.S. PATENT DOCUMENTS

| | | | |
|---|---|---|---|
| 2005/0213518 A1* | 9/2005 | Ahya | H04W 84/02 370/276 |
| 2007/0147630 A1* | 6/2007 | Chiloyan | H04M 1/6066 381/74 |
| 2008/0013544 A1* | 1/2008 | Ginde | H04L 29/06027 370/395.21 |
| 2008/0268903 A1* | 10/2008 | Tamura | H04M 1/6066 455/556.1 |

* cited by examiner

*Primary Examiner* — Tuan H Nguyen
(74) *Attorney, Agent, or Firm* — Morgan, Lewis & Bockius LLP

(57) ABSTRACT

Disclosed herein is a method of sending and receiving (or transceiving) audio stream in a wireless communication system. The method performed by a first device includes receiving reference codec information from a second device, performing an audio codec negotiation procedure for determining an audio codec to be used to send and receive audio stream to and from a third device, checking whether the audio codec determined through the audio codec negotiation procedure is identical with the audio codec supportable by the second device, and operating in bypass mode or conversion mode based on a result of the check.

16 Claims, 9 Drawing Sheets

METHOD AND APPARATUS FOR TRANSMITTING AND RECEIVING AUDIO STREAM IN WIRELESS COMMUNICATION SYSTEM

CROSS-REFERENCE TO RELATED APPLICATION

This application claims priority to Provisional Application No. 62/048,811 filed on 11 Sep. 2014 in US the entire contents of which is hereby incorporated by reference in its entirety.

BACKGROUND OF THE INVENTION

Field of the Invention

The present invention relates to a wireless communication system and, more particularly, to a method and apparatus for transmitting and receiving audio streams in a wireless communication system supporting Bluetooth communication.

Discussion of the Related Art

Bluetooth is one of representative short-distance radio technologies in which various devices (e.g., a smart phone, a PC, an earphone, and a headphone) are interconnected and exchange information. Furthermore, Bluetooth is a technology applied to most of smart phones, PCs, and notebooks and is easily used by many people. The easy pairing procedure of Bluetooth stably provides connectivity between devices. A recent low energy (LE) technology consumes less power and can stably provide information of several hundreds of KB.

The core specification of a Bluetooth standard technology is divided into a basic rate/enhanced data rate (BR/EDR) and low energy (LE).

The Bluetooth low energy (hereinafter referred to as "BLE") is a technology issued since Bluetooth Specification V4.0 and was designed for the purpose of high energy efficiency to existing Bluetooth.

The BLE technology may not be suitable for the real-time transmission of an audio stream in which a data transmission request is periodically generated because it has been designed so that a connection procedure is performed only when a data transmission request is generated between a master device and a slave device.

That is, when a slave requests data transmission and reception, a BLE master performs connection with the slave within a short time, exchanges required data with the slave within a relatively short time, and then performs disconnection.

In conventional Bluetooth communication, control and data transmission functions between a Bluetooth headset and a Bluetooth device (e.g., a smart phone) are provided using a hands free profile (HFP) for a telephone call (e.g., VoIP).

In conventional Bluetooth communication, from a viewpoint of an audio codec, a small number of codecs are mounted on a Bluetooth headset, and a smart phone performs a codec conversion so that audio stream data is transmitted and received between the Bluetooth headset and a remote terminal.

As described above, end to end audio stream delay and power consumption of a smart phone are increased due to a codec conversion in a smart phone.

In a Bluetooth device, a technology for call control, such as VoIP services (e.g., SIP, Skype, GoogleTalk, and FaceTime), through a smart phone or a PC is recently proposed.

In the case of the VoIP service, in general, an (audio) codec negotiation procedure between Bluetooth devices is performed prior to call connection between the Bluetooth devices.

Furthermore, in order to provide mutual compatibility between Bluetooth devices, a plurality of codecs must be mounted on and provided to a smart phone or a Bluetooth headset.

However, the application of a plurality of codecs to a Bluetooth headset is not preferred if limited resources (e.g., processing power and a memory unit) are taken into consideration. The application of a plurality of codecs to a smart phone inevitably increases the delay of the transmission and reception of end to end audio streams and power consumption of a Bluetooth device as described above.

SUMMARY OF THE INVENTION

Embodiments of this specification are directed to the provision of a method for setting audio codec information supportable by a smart phone in a headset prior to call connection between the headset and the smart phone.

Furthermore, embodiments of this specification are directed to the provision of a method for directly sending and receiving (or transceiving) an audio stream from an external device (or remote device) to and from a Bluetooth headset without decoding/encoding the audio stream in a smart phone in such a manner that a negotiation is performed with a codec designated in a media negotiation procedure when call connection with the external device is set up by sending and receiving the supportable audio codec information of the Bluetooth headset.

Technical objects to be achieved in this specification are not limited to the aforementioned objects, and those skilled in the art to which the present invention pertains may evidently understand other technical objects from the following description.

In this specification, there is provided a method of sending and receiving audio streams in a wireless communication system. The method performed by a first device includes receiving reference codec information from a second device, the reference codec information including information related to an audio codec supportable by the second device, performing an audio codec negotiation procedure for determining an audio codec to be used to send and receive audio streams to and from a third device, checking whether the audio codec determined through the audio codec negotiation procedure is identical with the audio codec supportable by the second device, and operating in bypass mode or conversion mode based on a result of the check.

Furthermore, in this specification, the method further includes performing a Bluetooth connection procedure along with the second device for a call control service.

Furthermore, in this specification, the call control service is defined by a GATT-based profile.

Furthermore, in this specification, the reference codec information is received through the advertising procedure or scanning procedure of Bluetooth low energy (BLE).

Furthermore, in this specification, the reference codec information includes at least one of information indicative of a service provider for an outgoing call, an audio codec list indicative of supportable audio codecs, and information indicative of an audio codec selected by a user.

Furthermore, in this specification, the audio codec list has preference order.

Furthermore, in this specification, the method further includes performing a call connection procedure along with the third device, wherein the audio codec negotiation procedure is performed through the call connection procedure.

Furthermore, in this specification, the audio codec negotiation procedure includes sending (or transmitting) the reference codec information received from the second device to the third device.

Furthermore, in this specification, operating in the bypass mode includes receiving an audio stream from the second device and forwarding the received audio stream to the third device.

Furthermore, in this specification, operating in the bypass mode includes receiving an audio stream from the third device and forwarding the received audio stream to the second device.

Furthermore, in this specification, operating in the conversion mode includes receiving an audio stream from the second device, converting the received audio stream into the audio stream of the audio codec determined through the audio codec negotiation procedure, and sending the converted audio stream to the third device.

Furthermore, in this specification, operating in the conversion mode includes receiving an audio stream from the third device, converting the received audio stream into the audio stream of the audio codec supportable by the second device, and sending the converted audio stream to the second device.

Furthermore, in this specification, the second device includes a Bluetooth headset, and the third device includes a remote device.

Furthermore, in this specification, the reference codec information is included in the invite message of a session initiation protocol (SIP).

Furthermore, in this specification, the information related to the audio codec determined through the audio codec negotiation procedure is included in the OK 200 message of a session initiation protocol (SIP).

Furthermore, in this specification, there is provided a first device for sending and receiving audio streams in a wireless communication system. The first device includes a communication unit configured to perform communication with the outside in a wireless or wired manner and a processor functionally connected to the communication unit. The processor performs control so that the first device receives reference codec information from a second device, performs an audio codec negotiation procedure for determining an audio codec to be used to send and receive audio streams to and from a third device, checks whether the audio codec determined through the audio codec negotiation procedure is identical with the audio codec supportable by the second device, and operates in bypass mode or conversion mode based on a result of the check. The reference codec information includes information related to an audio codec supportable by the second device.

This specification is advantageous in that it can improve audio performance felt by a user by reducing end to end delay because audio streams are transmitted and received between Bluetooth devices through the setting of reference codec information.

Furthermore, this specification is advantageous in that it can reduce power consumption of a smart phone because unnecessary audio decoding/encoding tasks are not performed in a smart phone.

Furthermore, this specification is advantageous in that it can reduce a memory unit cost for fabricating a Bluetooth headset and a codec license cost because an audio codec supported by a Bluetooth headset is selected and the number of audio codecs is limited.

Advantages which may be obtained in this specification are not limited to the aforementioned advantages, and various other advantages may be evidently understood by those skilled in the art to which the present invention pertains from the following description.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention

DETAILED DESCRIPTION OF THE EMBODIMENTS

Figure 1:
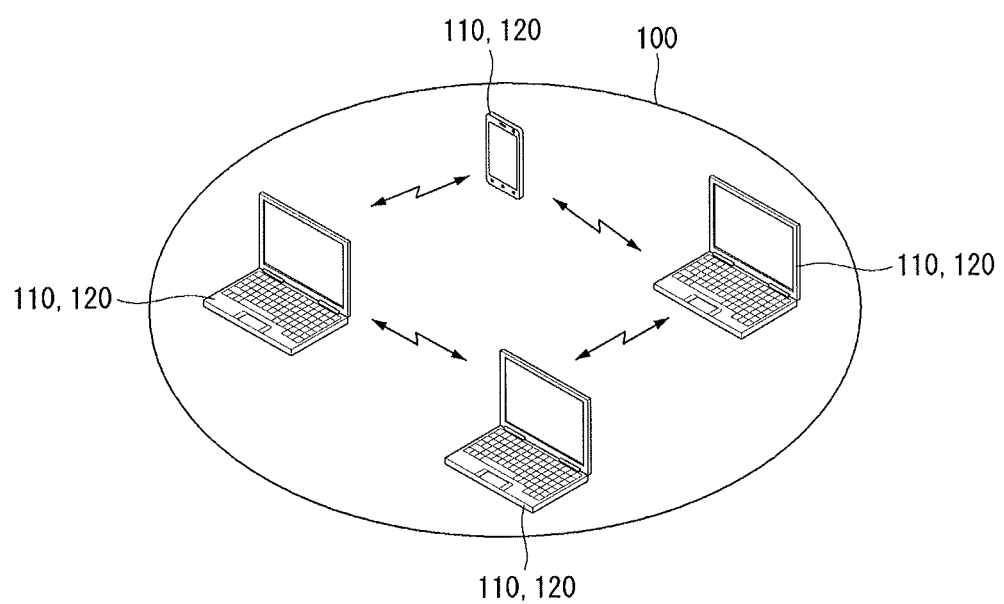
FIG. 1 is a schematic diagram showing an example of a wireless communication system to which methods proposed in this specification may be applied.

Hereinafter, embodiments of the present invention are described in more detail with reference to the accompanying drawings.

The suffix of an element used in the following description, such as a "module" or a "unit", is assigned by simply taking into consideration only the easiness of writing this specification. Accordingly, the "module" and "unit" may be interchangeably used.

A device described in this specification is a device capable of wireless communication, and may include a mobile phone including a smart phone, a tablet PC, a desktop PC, a notebook, and TV including smart TV and IPTV.

Furthermore, although embodiments of the present invention are described in detail with reference to the accompanying drawings and contents described in the drawings, the present invention is not limited to or restricted by the embodiments.

Terms used in this specification are common terms which are now widely used by taking into consideration functions in the present invention, but the terms may be changed depending on an intention of those skilled in the art, a use practice, or the appearance of a new technology.

Furthermore, in a specific case, some terms are randomly selected by the applicant. In this case, the meaning of a corresponding term is described in a corresponding part of a corresponding invention.

Accordingly, terms used in this specification should not be understood simply based on their names, but should be understood based on their substantial meanings and contents over this specification.

FIG. 1 is a schematic diagram showing an example of a wireless communication system to which methods proposed in this specification may be applied.

The wireless communication system 100 includes at least one server device 110 and at least one client device 120.

The server device and the client device perform Bluetooth communication using the Bluetooth low energy (BLE) technology.

First, compared to the Bluetooth basic rate/enhanced data rate (BR/EDR) technology, the BLE technology has a relatively small duty cycle, may be cheaply fabricated, and may operate for 1 year or more if a coin cell battery is used because it can greatly reduce power consumption through a low-speed data transfer rate.

Furthermore, in the BLE technology, a connection procedure between devices has been simplified, and a packet size is smaller than that of the Bluetooth BR/EDR technology.

In the BLE technology, (1) the number of RF channels is 40, (2) a data transfer rate of 1 Mbps is supported, (3) topology is a star architecture, (4) latency is 3 ms, (5) a maximum current is 15 mA or less, (6) output power is 10 mW (10 dBm) or less, and (7) the BLE technology is chiefly used in applications, such as mobile phones, watches, sports, health care, sensors, and device control.

The server device 110 may operate as a client device in the relationship with another device. The client device may operate as a server device in the relationship with another device. That is, in a BLE communication system, any one device may operate as a server device or client device and may operate as both a server device and a client device, if necessary.

The server device 110 may be represented as a data service device, a master device, a master, a server, a conductor, a host device, an audio source device, or a first device. The client device may be represented as a slave device, a slave, a client, a member, a sink device, an audio sink device, or a second device.

The server device and the client device correspond to major elements of the wireless communication system. The wireless communication system may include other elements in addition to the server device and the client device.

The server device refers to a device which is provided with data from the client device and provided with data from the client device through a response when a request for the data is received from the client device by directly communicating with the client device.

Furthermore, the server device sends (or transmits) a notification message and/or an indication message to the client device in order to provide the client device with data (or information). Furthermore, when the server device is to send (or transmit) an indication message to the client device, it receives a confirm message corresponding to the indication message from the client device.

Furthermore, in a process of sending and receiving notification, indication, and confirm messages to and from the client device, the server device may provide a user with data (or information) through a display unit or may receive a request inputted by a user through a user input interface.

Furthermore, in a process of sending and receiving messages to and from the client device, the server device may read data from a memory unit or may write new data in the memory unit.

Furthermore, a single server device may be connected to a plurality of client devices and may be easily connected to client devices again using bonding information.

The client device 120 refers to a device which requests the server device to send data (or information).

The client device receives data from the server device through a notification message and/or an indication message and sends a confirm message in response to an indication message when the indication message is received from the server device.

Like the server device, in a process of sending and receiving messages to and from the server device, the client device may provide a user with information through a display unit or may receive input from a user through a user input interface.

Furthermore, in a process of sending and receiving messages to and from the server device, the client device may read data from a memory unit or may write data new data in the memory unit.

Hardware elements, such as the display unit, user input interface, and memory unit of the server device and the client device, are described in detail with reference to FIG. 2.

Furthermore, the wireless communication system may configure a personal area network (PAN) through the Bluetooth technology. For example, in the wireless communication system, files and document can be exchanged rapidly and safely by establishing a private piconet between devices.

A BLE device (or apparatus may operate so that it supports various Bluetooth-related protocols, profiles, and processing.

Figure 2:
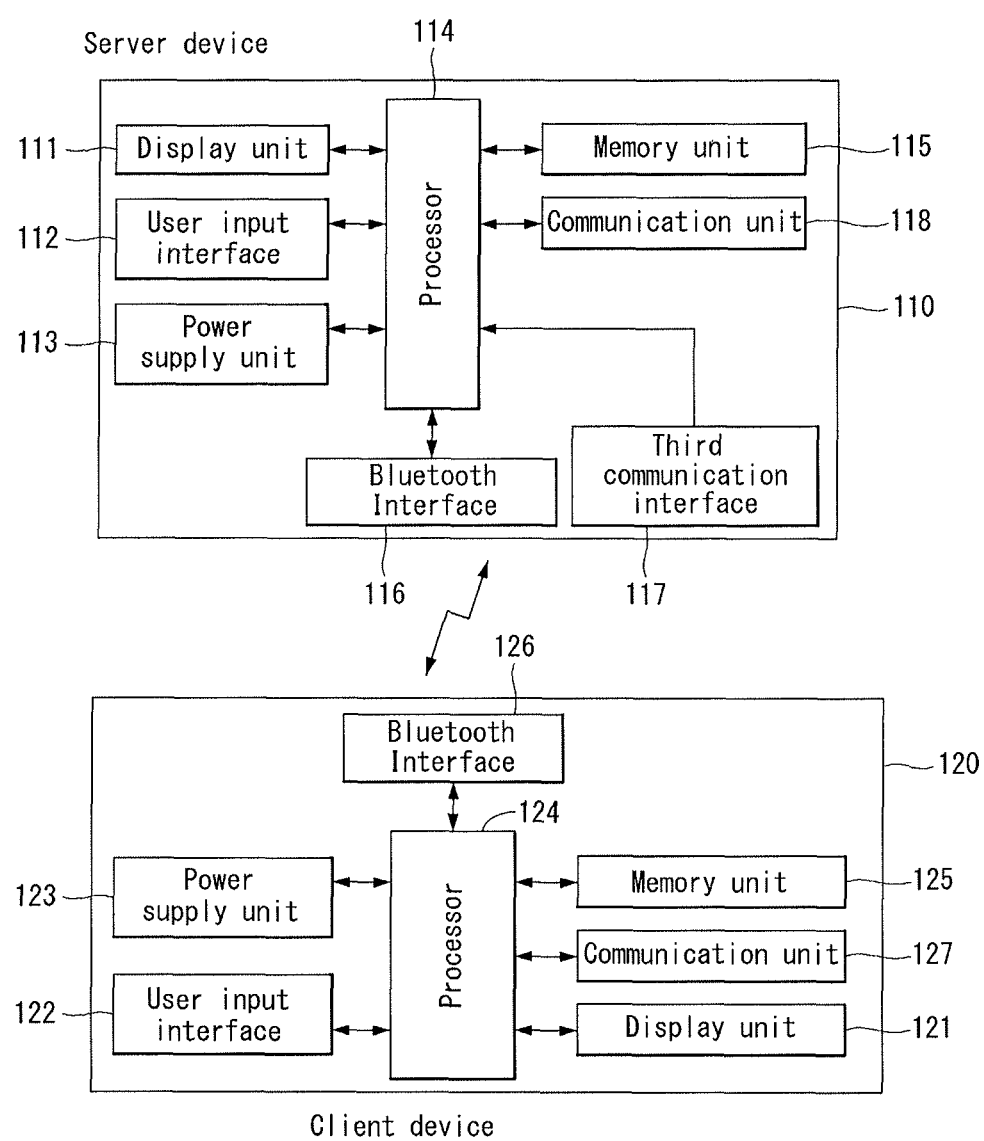
FIG. 2 shows an example of the internal block diagrams of a server device and a client device capable of implementing methods proposed in this specification.

FIG. 2 shows an example of the internal block diagrams of the server device and the client device capable of implementing methods proposed in this specification.

The server device may be connected to at least one client device.

Furthermore, the internal block diagram of each device may further include other elements (e.g., modules, blocks and/or units), and some of the elements of FIG. 2 may be omitted, if necessary.

As shown in FIG. 2, the server device 100 includes a display unit 111, a user input interface 112, a power supply unit 113, a processor 114, a memory unit 115, a Bluetooth Interface 116, a third communication interface 117, and a communication unit (or transmission/reception unit 118.

The display unit 111, the user input interface 112, the power supply unit 113, the processor 114, the memory unit 115, the Bluetooth interface 116, the third communication interface 117, and the communication unit 118 are functionally connected in order to perform methods proposed in this specification.

Furthermore, the client device include a display unit 121, a user input interface 122, a power supply unit 123, a processor 124, a memory unit 125, a Bluetooth interface 126, and a communication unit (or transmission/reception unit) 127.

The display unit 121, the user input interface 122, the power supply unit 123, the processor 124, the memory unit 125, the Bluetooth interface 126, and the communication unit 127 are functionally connected in order to perform methods proposed in this specification.

The Bluetooth interface 116 or 126 refers to a unit or module capable of sending request/response, command, notification, and indication/confirm message or data between devices using the Bluetooth technology.

The memory unit 115 or 125 is implemented in a variety of types of devices, and refers to a unit in which a variety of types of data is stored.

The processor 114 or 124 refers to a module for controlling an overall operation of the server device or the client device and performs control so that a request for sending a message and a received message are processed through the Bluetooth interface or the third communication interface.

The processor 114 or 124 may be represented as a control unit or a controller.

The processor 114 or 124 may include application-specific integrated circuits (ASIC), other chipsets, logic circuits and/or data processing devices.

The memory unit 115 or 125 may include read-only memory (ROM), random access memory (RAM), a flash memory unit, a memory unit card, a storage medium and/or other storage devices.

The communication unit 118 or 127 may include baseband circuits for processing radio signals. If an embodiment is implemented using software, the aforementioned scheme may be implemented in the form of a module (or process or function) for performing the aforementioned function. The module may be stored in the memory unit and executed by the processor.

The memory unit 115 or 125 may be placed inside or outside the processor 114 or 124 and may be connected to the processor 114 or 124 using various well-known means.

The display unit 111 or 121 refers to a module for providing a user with information about the state of the device and message exchange information through a screen.

The power supply unit 113 or 123 refers to a module for being supplied with external and internal power and supplying power for the operation of each element under the control of the control unit.

As described above, the BLE technology has a small duty cycle and can greatly reduce power consumption through a low-speed data transfer rate. Accordingly, the power supply unit can supply power for the operation of each element even using small output power (e.g., 10 mW (10 dBm) or less).

The user input interface 112 or 122 refers to a module for providing the control unit with a user input as indicated by a button on a screen so that the user may control the operation of the device.

Figure 3:
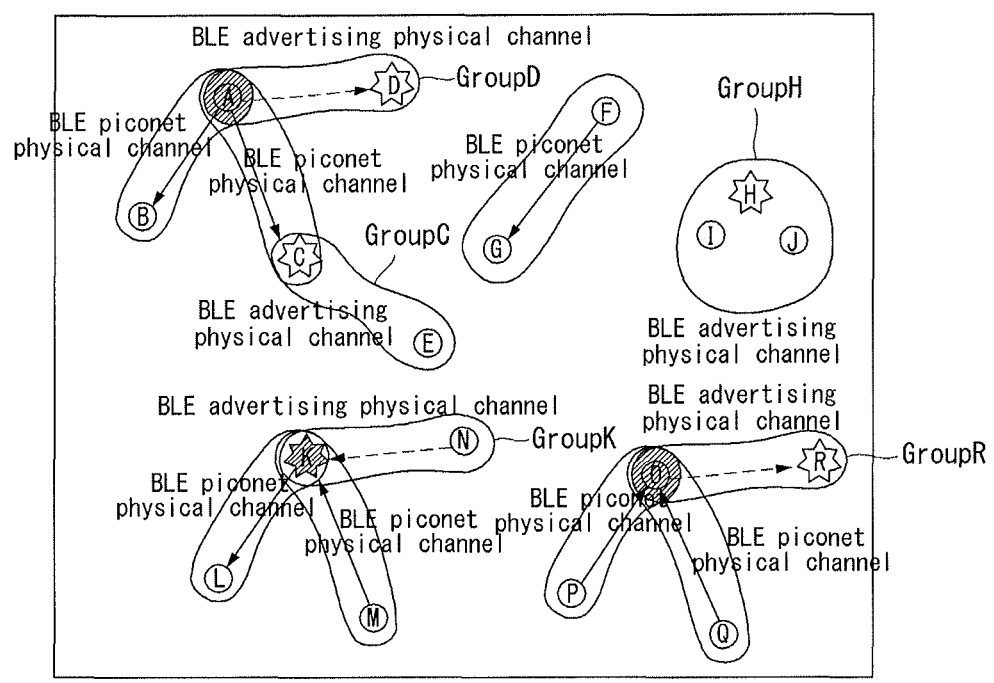
FIG. 3 shows an example of a Bluetooth low energy topology.

FIG. 3 shows an example of a Bluetooth low energy topology.

Referring to FIG. 3, a device A corresponds to a master in a piconet A (indicated by a shadow part) including a device B and a device C as slaves.

In this case, the piconet means a set of devices which occupy a shared physical channel, wherein any one of a plurality of the devices is a master and the remaining devices are connected to the master device.

A BLE slave does not share a common physical channel with a master. Each slave communicates with the master through a separate physical channel. There is another piconet F including a master device F and a slave device G.

A device K is present in a scatternet K. In this case, the scatternet means a group of piconets having connection between different piconets.

The device K is the master of a device L and is also the slave of a device M.

A device O is also present in a scatternet O. The device O is the slave of a device P and the slave of the device Q.

As shown in FIG. 3, 5 different device groups are present.

A device D is an advertiser, and the device A is an initiator (a group D).

A device E is a scanner, and the device C is an advertiser (a group C).

A device H is an advertiser, and devices I and J are scanners (a group H).

The device K is an advertiser, and a device N is an initiator (a group K).

A device R is an advertiser, and the device O is an initiator (a group R).

The devices A and B use one BLE piconet physical channel.

The devices A and C use different BLE piconet physical channels.

In the group D, the device D performs advertising using an advertising event which may be connected on an advertising physical channel, and the device A is an initiator. The device A may form connection with the device D and may add a device to the piconet A.

In the group C, the device C performs advertising on an advertising physical channel using any type of an advertising event captured by the scanner device E.

In order to avoid a collision, the group D and the group C may use different advertising physical channels or different times.

One physical channel is present in the piconet F. The devices F and G use one BLE piconet physical channel. The device F is a master, and the device G is a slave.

One physical channel is present in the group H. The devices H, I, and J use one BLE advertising physical channel. The device H is an advertiser, and the devices I and J are scanners.

In the scatternet K, the devices K and L use one BLE piconet physical channel. The devices K and M use different BLE piconet physical channels.

In the group K, the device K performs advertising using an advertising event which may be connected on an advertising physical channel, and the device N is an initiator. The device N may form connection with the device K. In this case, the device K is a slave of two devices and is also a master of any one device.

In the scatternet O, the devices O and P use one BLE piconet physical channel. The devices O and Q use different BLE piconet physical channels.

In the group R, the device R performs advertising using an advertising event which may be connected on an advertising physical channel, and the device O is an initiator. The device O may form connection with the device R. In this case, the device O is a slave of two devices and is also a master of any one device.

Figure 4:
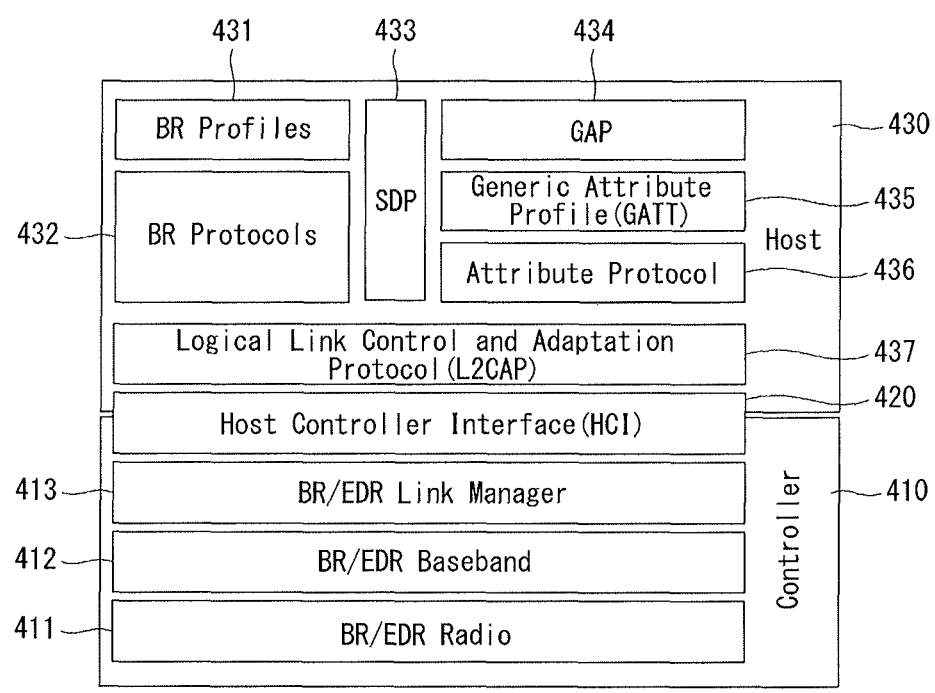
FIGS. 4 and 5 are diagrams showing examples of a Bluetooth communication architecture to which methods proposed in this specification may be applied.
Figure 5:
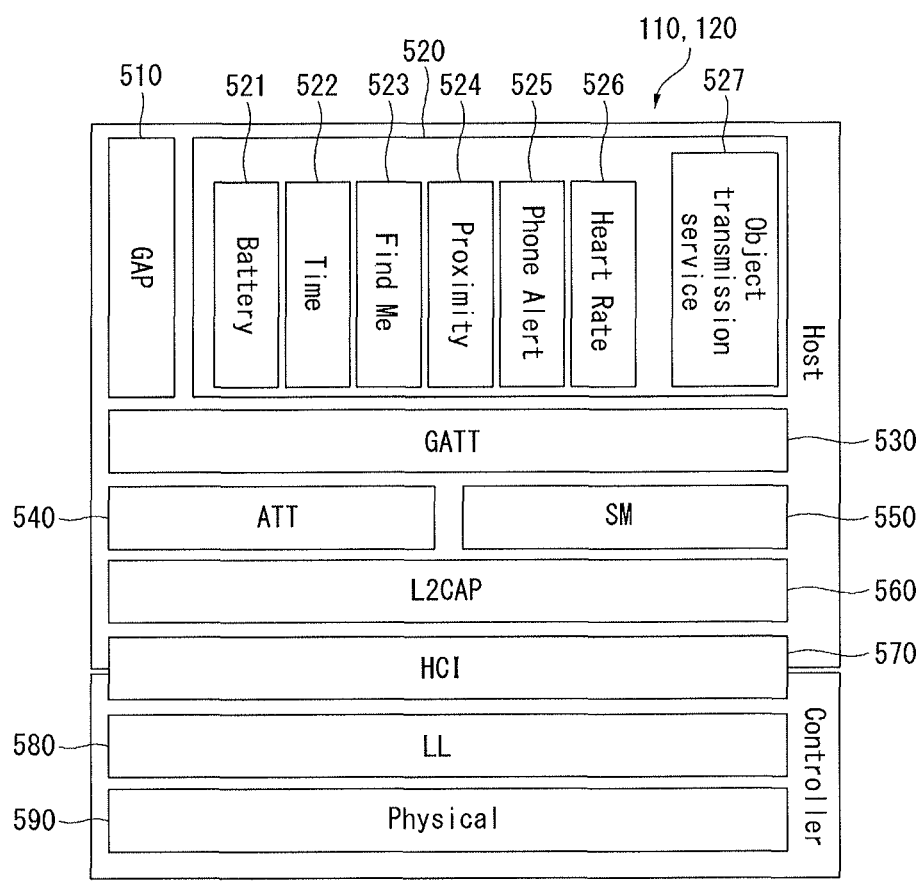

FIGS. 4 and 5 are diagrams showing examples of a Bluetooth communication architecture to which methods proposed in this specification may be applied.

More specifically, FIG. 4 shows an example of a Bluetooth basic rate/enhanced data rate (BR/EDR) architecture, and FIG. 5 shows an example of Bluetooth low energy (LE) architecture.

First, as shown in FIG. 4, the Bluetooth BR/EDR architecture includes a controller stack 410, a host controller interface (HCI) 420, and a host stack 430.

The controller stack (or controller module) 410 refers to hardware for sending or receiving a Bluetooth packet to or from a wireless transmission/reception module for receiving a Bluetooth signal of 2.4 GHz. The controller stack 410 may include a BR/EDR Radio layer 411, a BR/EDR baseband layer 412, and a BR/EDR link manager layer 413.

The BR/EDR radio layer 411 is a layer for sending and receiving a radio signal of 2.4 GHz and may send data by hopping 79 RF channels if Gaussian frequency shift keying (GFSK) modulation is used.

The BR/EDR baseband layer 412 functions to send a digital signal, selects a channel sequence for 1600 hopping per second, and sends a time slot of 625 us in length for each channel.

The link manager layer 413 controls an overall operation (e.g., link setup, control, and security) for Bluetooth connection using a link manager protocol (LMP).

The link manager layer may perform the following functions.

Perform ACL/SCO logical transport and logical link setup and control.

Detach: stop connection and notify a counterpart device of a reason for stop.

Perform power control and role switch.

Perform a security (e.g., authentication, pairing, and encryption) function.

The controller interface layer 420 provides an interface between the host module 430 and the controller module 410 so that the host provides commands and data to the controller and the controller provides events and data to the host.

The host stack (or host module) 430 includes a logical link control and adaptation protocol (L2CAP) 437, a service discovery protocol (SDP) 433, BR/EDR protocols 432, BR/EDR profiles 431, an attribute protocol 436, a generic access profile (GAP) 434, and a generic attribute profile (GATT) 435.

The L2CAP 437 provides a specific protocol or profile with one bidirectional channel for sending data.

The L2CAP multiplexes various protocols and profiles provided by the upper layer of Bluetooth.

A dynamic channel is used in the L2CAP of the Bluetooth BR/EDR. The L2CAP supports a protocol service multiplexer, retransmission mode, and streaming mode and provides segmentation and reassembly, per-channel flow control, and error control.

The SDP 433 refers to a protocol for discovering a service (or profile and protocol) supported by a Bluetooth device.

The BR/EDR protocols and profiles 432 and 431 define services (or profiles) using the Bluetooth BR/EDR and application protocols for exchanging such data.

The attribute protocol 436 is a server-client architecture, and defines a rule for accessing the data of a counterpart device. There are 6 message (i.e., a request message, a response message, a command message, a notification message, and an indication message) types as follows.

A request message from a client to a server with a response message from the server to the client.

A command message from a client to a server without a response message.

A notification message from a server to a client without a confirm message

An indication message from a server to a client with a confirm message from the client to the server.

The generic attribute profile (GATT) 435 defines the type of attribute.

The generic access profile (GAP) 434 defines device discovery, connection, and a scheme for providing a user with information and provides privacy.

As shown in FIG. 5, the BLE architecture includes a controller stack which may operate so that it processes a wireless device interface whose timing is important and a host stack which may operate so that it processes high-level data.

The controller stack may be called a controller, but is hereinafter called the controller stack in order to avoid confusion with the processor, that is, an internal element of the device described with reference to FIG. 2.

First, the controller stack may be implemented using a communication module which may include a Bluetooth wireless device and a processor module which may include a processing device, such as a microprocessor.

The host stack is part of an OS operating on the processor module and may be implemented as an instantiation of a package (pACKage) on the OS.

In some examples, the controller stack and the host stack may operate or may be executed on the same processing device within the processor module.

The host stack includes a generic access profile (GAP) 510, GATT based profiles 520, a generic attribute profile (GATT) 530, an attribute protocol (ATT) 540, a security manage (SM) 550, and a logical link control and adaptation protocol (L2CAP) 560. The host stack may include various protocols and profiles in addition to the elements.

The host stack multiplexes various protocols and profiles provided by the upper layer of Bluetooth using the L2CAP.

First, the logical link control and adaptation protocol (L2CAP) 560 provides a specific protocol or profile with one bidirectional channel for sending data.

The L2CAP may operate so that it multiplexes data between higher layer protocols, segments and reassembles packages, and manages the transmission of multicast data.

In the BLE technology, 3 fixed channels (e.g., one channel for a signaling channel, one channel for the security manager, and one channel for an attribute protocol) are used.

In contrast, in the basic rate/enhanced data rate (BR/EDR), dynamic channels are used, and a protocol service multiplexer, retransmission, and streaming mode are supported.

The SM 550 is a protocol for authenticating a device and providing a key distribution.

The ATT 540 is a server-client architecture, and defines a rule for accessing the data of a counterpart device. The ATT includes 6 message types (i.e., a request, a response, a command, notification, indication, and confirmation).

That is, ① the request message and ② the response message: the request message is a message for requesting specific information from a client device to a server device. The response message is a response message for a request message and refers to a message transmitted from a server device to a client device.

③ The command message is a message transmitted from a client device to a server device in order to indicate the command of a specific operation. A server device does not send a response to a command message to a client device.

④ The notification message is a message transmitted from a server device to a client device in order to provide notification of an event. A client device does not send a confirmation message for a notification message to a server device.

⑤ The indication message and ⑥ the confirm message are messages transmitted from a server device to a client device in order to provide notification of an event. Unlike in the notification message, a client device sends a confirmation message for an indication message to a server device.

The GAP is a layer newly implemented for the BLE technology and is used to select a role for communication between BLE devices and control how a multi-profile operation is performed.

Furthermore, the GAP is chiefly used for device discovery, the formation of connection, and a security procedure part. The GAP defines a scheme for providing information to a user and defines the type of following attributes.

① Service: Define the basic operation of a device through a combination of behaviors related to data ② Include: Define the relationship between services ③ Characteristics: A data value used in a service ④ Behavior: A computer-readable format defined in a universal unique identifier (UUID) value type The GATT-based profiles have dependency on the GATT and are chiefly applied to a BLE device. The GATT-based profiles may include a battery, time, FindMe, proximity, time, and an object delivery service. Detailed contents of the GATT-based profiles are as follows.

Battery: A battery information exchange method

Time: A time information exchange method

FindMe: Provide an alarm service according to the distance

Proximity: A battery information exchange method

Time: A time information exchange method

Call Control Service: A supportable codec information exchange method

The GATT may operate as a protocol that describes how the ATT is used when services are configured. For example, the GATT may operate so that it defines how ATT attributes are grouped with services and may operate so that it describes characteristics associated with services.

Accordingly, the GATT and the ATT may use characteristics in order to describe the state and services of a device and to describe how the characteristics are related and how the characteristics are used.

The controller stack includes a physical layer 590, a link layer 580, and a host controller interface (HCI) 570.

The physical layer (or wireless transmission/reception module) 590 is a layer for sending and receiving a radio signal of 2.4 GHz and uses Gaussian frequency shift keying (GFSK) modulation and a frequency hopping scheme including 40 RF channels.

The link layer 580 sends or receives a Bluetooth packet.

Furthermore, the link layer performs an advertising and scanning function using 3 advertising channels and provides a function for generating connection between devices and exchanging data packets of a maximum of 42 bytes through 37 data channels.

The host controller interface (HCI) provides an interface between the host stack and the controller stack, enables commands and data to be provided from the host stack to the controller stack, and enables events and data to be provided from the controller stack to the host stack.

Procedures of the Bluetooth low energy (BLE) technology are described in brief below.

The BLE procedures may be divided into a device filtering procedure, an advertising procedure, a scanning procedure, a discovering procedure, and a connection procedure.

Device Filtering Procedure

The device filtering procedure is a method of reducing the number of devices which perform responses to a request, indication, and notification in the controller stack.

When receiving a request, all devices do not need to make responses to the request. Accordingly, the controller stack may perform control so that power consumption is reduced in the BLE controller stack by reducing the number of transmitted requests.

An advertising device or a scanning device may perform the device filtering procedure in order to limit the number of devices which receive an advertising packet, a scan request, or a connection request.

In this case, the advertising device refers to a device that sends an advertising event, that is, performs advertising, and is also called an advertiser.

The scanning device refers to a device that performs scanning and a device that sends a scan request.

In the BLE technology, if a scanning device receives some advertising packets from an advertising device, the scanning device needs to send a scan request to the advertising device.

However, if the device filtering procedure is used and thus the transmission of a scan request is unnecessary, the scanning device may neglect the advertising packets transmitted by the advertising device.

The device filtering procedure may also be used in a connection request process. If device filtering is used in a connection request process, a response to a connection request does not need to be transmitted by neglecting the connection request.

Advertising Procedure

An advertising device performs the advertising procedure in order to perform non-directional broadcast to devices within an area.

In this case, the non-directional broadcast refers to broadcast in all directions not broadcast in a specific direction.

In contrast, directional broadcast refers to broadcast in a specific direction. The non-directional broadcast is generated without a connection procedure between an advertising device and a device in a listening state (hereinafter referred to as a "listening device").

The advertising procedure is used to establish Bluetooth connection with a nearby initiator device.

Alternatively, the advertising procedure may be used to provide the periodic broadcast of user data to scanning devices which perform listening in an advertising channel.

In the advertising procedure, all the advertising (or advertising events) are broadcast through an advertising physical channel.

An advertising device may receive a scan request from a listening device which performs listening in order to obtain additional user data from the advertising device. An advertising device sends a response to a scan request to a device that has sent the scan request through the same advertising physical channel as an advertising physical channel through which the scan request has been received.

Broadcast user data transmitted as part of advertising packets is dynamic data. In contrast, scan response data is commonly static data.

An advertising device may receive a connection request from an initiator device on an advertising (broadcast) physical channel. If an advertising device has used an advertising event capable of being connected and an initiator device has not been filtered by the device filtering procedure, the advertising device stops advertising and enters connected mode. The advertising device may start the advertising again after connected mode.

Scanning Procedure

A device which performs scanning, that is, a scanning device, performs the scanning procedure in order to listen to the non-directional broadcast of user data from advertising devices which use an advertising physical channel.

A scanning device sends a scan request to an advertising device through an advertising physical channel in order to request additional user data from the advertising device. The advertising device sends a scan response, that is, a response to the scan request, including the additional user data requested by the scanning device, through the advertising physical channel.

The scanning procedure may be used for connection with another BLE device in a BLE piconet.

If a scanning device receives a broadcast advertising event and is in initiator mode in which a connection request may be initiated, the scanning device may start Bluetooth connection with an advertising device by sending a connection request to the advertising device through an advertising physical channel.

If a scanning device sends a connection request to an advertising device, the scanning device stops initiator mode scanning for additional broadcast and enters connected mode.

Discovering Procedure

Devices capable of Bluetooth communication (hereinafter referred to as a "Bluetooth device") perform the advertising procedure and the scanning procedure in order to discover devices present nearby or to be discovered by other devices in a given area.

The discovering procedure is asymmetrically performed. A Bluetooth device trying to discover other surrounding devices is called a discovering device, and performs listening in order to discover devices which advertise advertising events which may be scanned. A Bluetooth device which is discovered by another device and may be used is called a discoverable device, and broadcasts an advertising event so that another device may actively scan the advertising event through an advertising (broadcast) physical channel.

Both a discovering device and a discoverable device may have already been connected to other Bluetooth devices in a piconet.

Connection Procedure

The connection procedure is asymmetrical. The connection procedure requests another Bluetooth device to perform a scanning procedure while a specific Bluetooth device performs an advertising procedure.

That is, the advertising procedure may become an object. As a result, only one device may respond to advertising. Connection may be initiated by receiving an advertising event which may be accessed from an advertising device and sending a connection request to the advertising device through an advertising (broadcast) physical channel.

An operation state in the BLE technology, that is, an advertising state, a scanning state, an initiating state, and a connection state, are described in brief below.

Advertising State

A link layer LL enters the advertising state in response to the indication of a host (stack). If the link layer is in the advertising state, the link layer sends advertising packet data units (PDU) in advertising events.

Each of the advertising events includes at least one advertising PDU. The advertising PDUs are transmitted through advertising channel indices which are used. An advertising event may be terminated if it has been transmitted through an advertising channel index in which an advertising PDU is used or may be terminated a little earlier if an advertising device needs to secure the space for performing other functions.

Scanning State

The link layer enters the scanning state in response to the indication of a host (stack). In the scanning state, the link layer listens to advertising channel indices.

The scanning state includes two types: passive scanning and active scanning. Each scanning type is determined by a host.

A separate time or advertising channel index for performing scanning is not defined.

In the scanning state, the link layer listens to an advertising channel index for scan window (scanWindow) duration. A scan interval (scanInterval) is defined as the interval between the start points of two consecutive scan windows.

If a collision is not present in scheduling, the link layer needs to perform listening in order to complete all the scan intervals of a scan window as indicated by a host. In each scan window, the link layer needs to scan another advertising channel index. The link layer uses all available advertising channel indices.

In the case of passive scanning, the link layer receives only packets, but does not send any packet.

In the case of active scanning, the link layer perform listening in order to request advertising PDUs and an advertising PDU type capable of requesting additional information related to an advertising device from the advertising device.

Initiating State

The link layer enters the initiating state in response to the indication of a host (stack).

When the link layer is in the initiating state, the link layer listens to advertising channel indices.

In the initiating state, the link layer listens to an advertising channel index for scan window duration.

Connection State

The link layer enters the connection state when a device performing a connection request, that is, an initiator device, sends a CONNECT_REQ PDU to an advertising device or when an advertising device receives a CONNECT_REQ PDU from an initiator device.

After the link layer enters the connection state, the formation of connection is taken into consideration. Such connection does not need to be taken into consideration at a point of time at which the link layer enters the connection state. A sole difference between newly formed connection and existing connection is a link layer connection supervision timeout value.

If two devices are connected, the two devices perform different roles.

A link layer functioning as a master is called a master, and a link layer functioning as a slave is called a slave. The master controls timing of a connection event, and the connection event refers to a point of time at which the master and the slave are synchronized.

Packets defined in the Bluetooth interface are described in brief below. BLE devices use packets defined below.

Packet Format

A link layer has only one packet format used for both an advertising channel packet and a data channel packet.

Each of the packets includes four fields: a preamble, an access address, a PDU, and CRC.

When one packet is transmitted in an advertising physical channel, the PDU may become an advertising channel PDU. When one packet is transmitted in a data physical channel, the PDU may become a data channel PDU.

Advertising Channel PDU

The advertising channel PDU has a header of 16 bits and a payload of various sizes.

The PDU type fields of the advertising channel PDU included in the header have PDU types defined in Table 1.

TABLE 1

| PDU Type | PACKet Name |
|---|---|
| 0000 | ADV-IND |
| 0001 | ADV_DIRECT_IND |

TABLE 1-continued

| PDU Type | PACKet Name |
|---|---|
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are called advertising PDUs and are used in detailed events.

ADV_IND: A non-directional advertising event capable of connection

ADV_DIRECT_IND: A directional advertising event capable of connection

ADV_NONCONN_IND: A non-directional advertising event incapable of connection

ADV_SCAN_IND: A non-directional advertising event capable of scanning

The PDUs are transmitted in the link layer in the advertising state and are received by the link layer in the scanning state or the initiating state.

Scanning PDUs

The following advertising channel PDU types are called scanning PDUs and are used in the state described below.

SCAN_REQ: It is transmitted by the link layer in the scanning state and is received by the link layer in the advertising state.

SCAN_RSP: It is transmitted by the link layer in the advertising state and is received by the link layer in the scanning state.

Initiating PDU

The following advertising channel PDU type is called an initiating PDU.

CONNECT_REQ: It is transmitted by the link layer in the initiating state and is received by the link layer in the advertising state.

Data Channel PDU

The data channel PDU has a header of 16 bits and a payload of various sizes and may include a message integrity check (MIC) field.

The procedures, state, and packet format in the BLE technology described above may be used to perform methods proposed in this specification.

Session Initiation Protocol (SIP)

A session initiation protocol (SIP) for VoIP service is described in brief below.

As the Internet is developed, real-time multimedia type services, such as telephone and video, are added to the existing data-based service type.

Protocols capable of providing services of such various types are emerging, and the SIP of the protocols has been in the spotlight.

The SIP is a protocol supporting the creation and termination of a real-time multimedia session, such as voice and video, and independently operates in a transport layer unlike in a common application layer. That is, the SIP may operate regardless of the type of a created session.

The SIP may operate along with protocols, such as an RSVP, an RTP, and an SDP, in order to send multimedia data. In this case, the RSVP is a protocol for reserving resources, the RTP is a protocol for real-time data transmission, and the SDP is a protocol indicative of the characteristics of a multimedia session. Accordingly, in order to provide a complete service, other protocols need to be used along with the SIP. Table 2 below indicates an example of an SIP message.

TABLE 2

| SIP message | Description |
|---|---|
| INVITE | Call origination |
| 200 OK | Success response (receiver accepts call in the case of INVITE) |
| Contact | SIP message header indicating response through address within contact |
| REGISTER | Register with SIP server |

A method for performing call control between Bluetooth devices through the setting of a reference codec proposed in this specification is described below.

That is, this specification provides a call control method for (1) setting a reference codec between a Bluetooth headset and a Bluetooth device (smart phone 1), (2) performing an audio codec negotiation procedure between Bluetooth devices (a smart phone and a remote device), and (3) using Bluetooth communication.

A smart phone 2 or a Bluetooth device 2 used herein means a remote device (or remote terminal or remote device) having a (VoIP) call connected with a smart phone 1 (Bluetooth device 1).

First, a method of performing call control through an audio codec negotiation procedure between conventional Bluetooth devices, that is, a conventional method, is described in brief for convenience sake.

That is, a method for transmitting and receiving audio streams to and from a remote device using a Bluetooth headset is first described with reference to FIG. 6 describing the conventional method, and a call control method proposed in this specification is described compared to FIG. 6.

Figure 6:
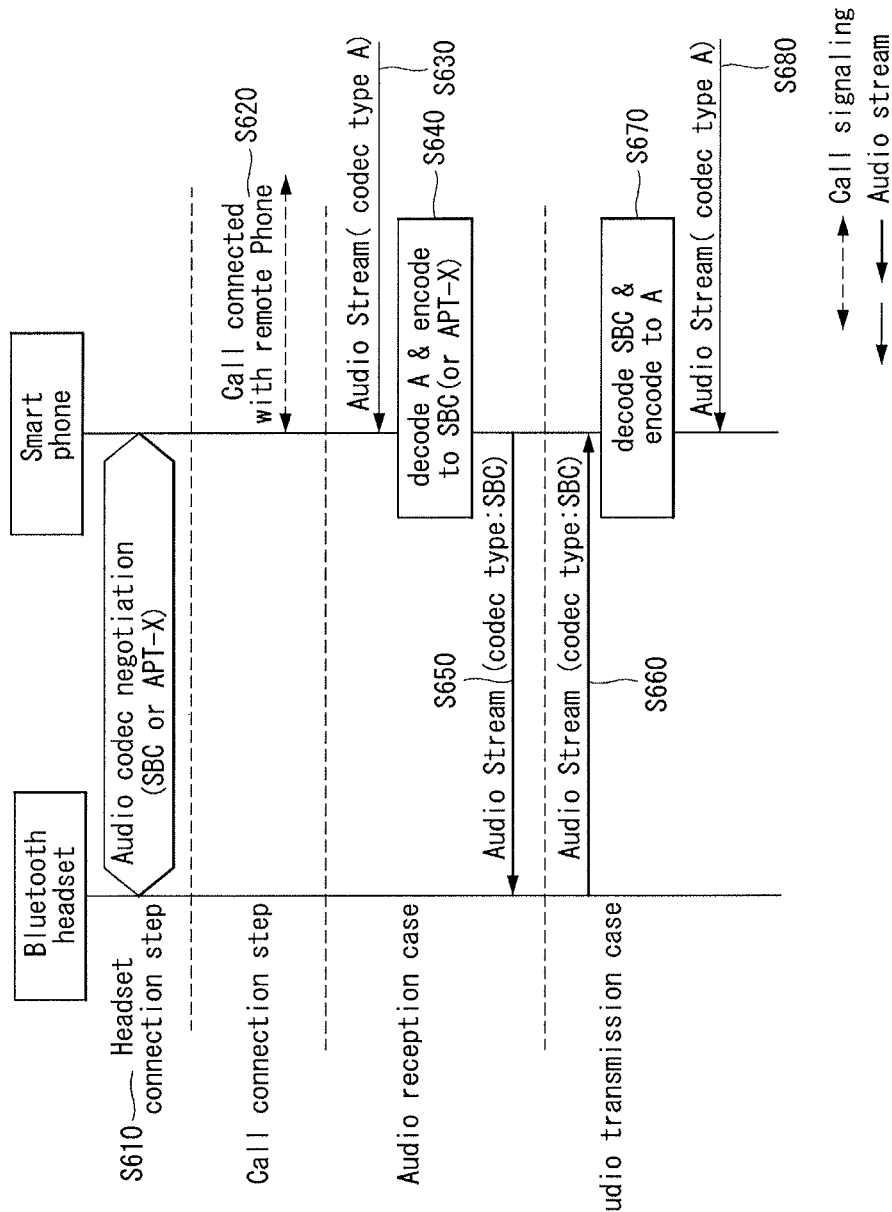
FIG. 6 is a flowchart illustrating an example of a method for transmitting and receiving audio streams using a Bluetooth headset.

FIG. 6 is a flowchart illustrating an example of a method for transmitting and receiving audio streams using a Bluetooth headset.

For detailed contents related to FIG. 6, reference is made to the procedures defined in the Bluetooth hands-free profile (HFP).

Referring to FIG. 6, the Bluetooth device 1 (Bluetooth headset) performs a Bluetooth headset connection procedure along with the Bluetooth device 2 (smart phone) at step S610.

Hereinafter, the Bluetooth device 1 is called a Bluetooth headset and the Bluetooth device 2 is called a smart phone, for convenience of description.

Through the Bluetooth headset connection procedure, the Bluetooth headset and the smart phone perform an audio codec negotiation procedure for determining an audio codec to be used when an audio stream is transmitted and received.

In this case, the audio codec may be a sub-band codec (SBC) or APT-X.

That is, the Bluetooth headset and the smart phone send and receive audio streams using the audio codec determined at step S610.

Thereafter, the smart phone, together with an external remote device, performs a call connection procedure at step S620.

After the call connection procedure, the Bluetooth headset receives an audio stream from the remote device and sends an audio stream to the remote device.

First, a process of receiving, by the Bluetooth headset, an audio stream from the remote device is described.

After step S620, the smart phone receives (or decodes) an audio stream of an audio codec type A from the remote device at step S630.

Thereafter, the smart phone checks whether the received (or decoded) audio stream is an audio codec supportable by the Bluetooth headset (i.e., whether the received (or decoded) audio stream is an audio codec negotiated at step S610).

If, as a result of the check, the received audio stream is found to be the audio stream of an audio codec not supported by the Bluetooth headset, the smart phone encodes (or converts) the received audio stream of the audio codec type A into the audio stream of an audio codec (SBC or APT-X) supported by the Bluetooth headset at step S640.

Thereafter, the smart phone sends the converted audio stream to the Bluetooth headset at step S650.

A procedure of sending, by the Bluetooth headset, an audio stream to the remote device is described below.

After step S620, the Bluetooth headset sends an audio stream to which the audio codec (SBC or APT-X) negotiated at step S610 has been applied to the smart phone at step S660.

Thereafter, the smart phone checks whether the audio codec of the received (or decoded) audio stream is an audio codec supported by the remote device (or negotiated with the remote device).

If, as a result of the check, the audio codec (e.g., SBC) of the received audio stream is found to be different from the audio codec (codec type A) supported by the remote device, the smart phone encodes (or converts) the received audio stream into the audio stream of an audio codec supported by the remote device at step S670.

Thereafter, the smart phone sends the audio stream, encoded at step S670, to the remote device at step S680.

In summary, in FIG. 6, if the codecs of audio streams received or transmitted by a Bluetooth headset and a remote device (or remote terminal) are different, a smart phone performs an (encoding/decoding) procedure for converting or encoding the audio streams in order to make identical the audio streams.

In the case of FIG. 6, the smart phone may unnecessarily perform a procedure for decoding/encoding an audio stream.

Accordingly, 1) end to end delay and 2) resource consumption of a smart phone may be increased.

A method for transmitting and receiving audio streams between a Bluetooth headset and a remote device using the reference codec information of the Bluetooth headset without encoding/decoding an audio stream in the smart phone, which is proposed in this specification, is described below The "setting of reference codec information" may include setting, by a Bluetooth headset, information about an audio codec supportable by the Bluetooth headset, sending the information to a smart phone (prior to call connection), and storing, by the smart phone, the information.

Figure 7:
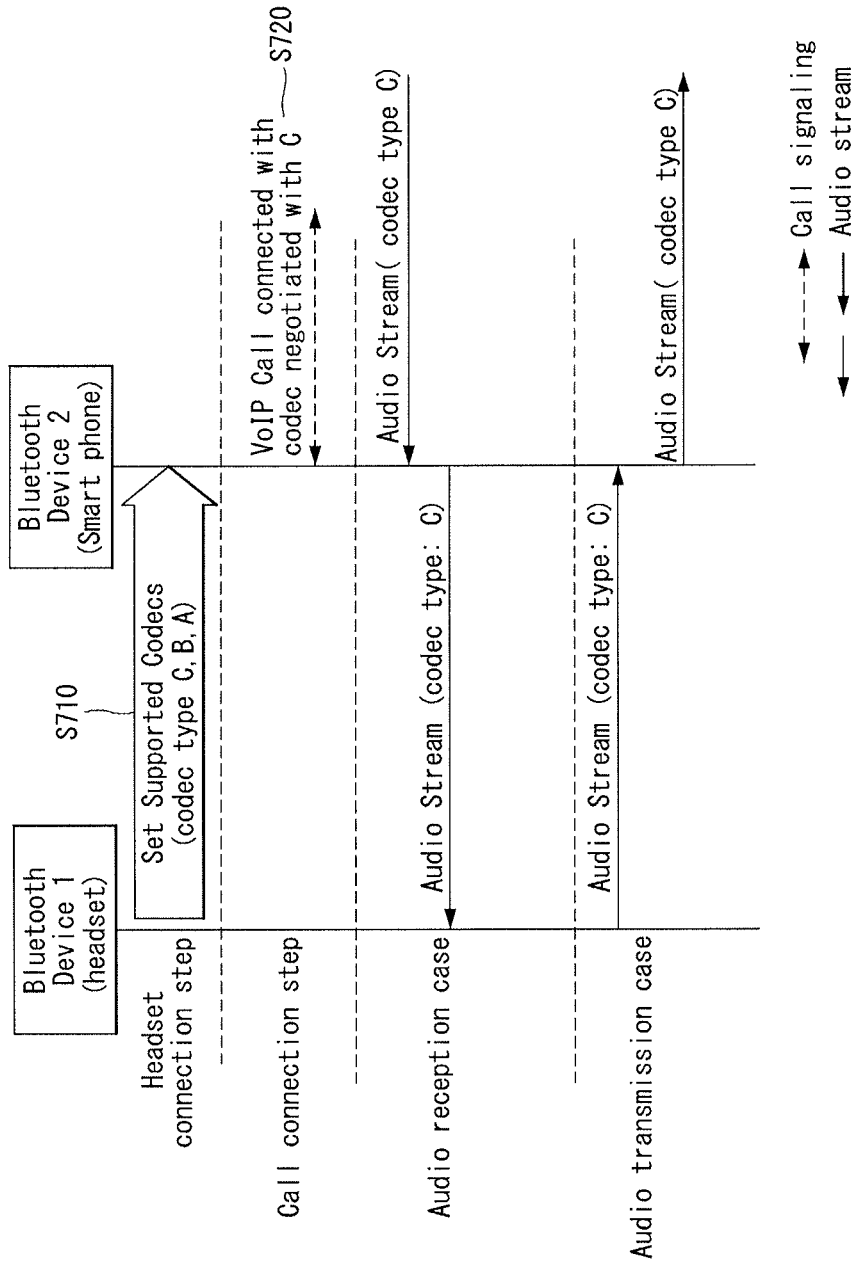
FIG. 7 is a flowchart illustrating an example of a method for setting reference codec information and transmitting and receiving audio streams, which is proposed in this specification.

FIG. 7 is a flowchart illustrating an example of a method for setting reference codec information and transmitting and receiving audio streams, which is proposed in this specification.

Referring to FIG. 7, a Bluetooth headset, together with a smart phone, performs a Bluetooth headset connection procedure.

The Bluetooth headset sends reference codec information, including the type of audio codec supported (or supportable) by the Bluetooth headset, to the smart phone through the Bluetooth headset connection procedure at step S710.

Step S710 may be performed through the aforementioned advertising procedure, scanning procedure, and connection procedure of the BLE technology.

That is, the reference codec information may be included in messages or PDUs exchanged in the advertising procedure, the scanning procedure and/or the connection procedure.

In this case, if the number of reference codecs is plural, the Bluetooth headset may send preference audio codec information indicative of the type of audio codec, preferred by the Bluetooth headset in order to send or receive an audio stream, to the smart phone at step S710.

Furthermore, if several reference codecs are present, the smart phone may send information, indicating that a negotiated audio codec corresponds to which one of the reference codecs in order to send and receive audio streams, to the Bluetooth headset through a call connection procedure with the remote device.

The Bluetooth headset connection procedure of S710 may be performed using the GATT-based profile of BLE.

To this end, a call control service may be newly defined in the GATT-based profile of BLE.

In this case, a client device (i.e., the Bluetooth headset) may expose the call control service defined in the GATT-based profile, and a server device (i.e., the smart phone) may store the GATT-based profile.

That is, if a procedure for sending and receiving reference codec information between the Bluetooth headset and the smart phone is performed using the GATT-based profile, the Bluetooth headset and the smart phone may exchange parameters shown in Table 3 below.

More specifically, in Table 3, parameters 1 to 12 may be parameters inquired from the client device to the server device. In Table 3, parameters 13 and 14 may be parameters inquired from a server device to a client device.

Accordingly, the parameters 1 to 12 may be stored in the server device, and the parameters 13 and 14 may be stored in the client device.

In addition, the parameters of Table 3 may be stored in both the server device and the client device or parameters stored in the server device and the client device may be changed, if necessary.

TABLE 3

| No. | Data Name | Requirement | Minimum Required Range | Data Type |
|---|---|---|---|---|
| 1 | Call Index | Locally Unique Identifier. | Unlimited | TBD |
| 2 | Line/Remote Party Identifier | Textual representation of the remote party. This can be a phone number, URI, name, etc. | N/A | String |
| 3 | Local Identifier | Textual representation of the local identity. This can be a phone number, URI, name, etc. | N/A | String |
| 4 | Call State | Call states that are supported by the underlying technologies. | Dialing, ringing, active, held, incoming | TBD |
| 5 | Call Direction | Whether the call is incoming or | Incoming, Outgoing | Boolean |

TABLE 3-continued

| No. | Data Name | Requirement | Minimum Required Range | Data Type |
|---|---|---|---|---|
| 6 | Disconnect Reason | If the call has been disconnected, the reason (if known). | 0 . . . 2^32−1 | Unsigned Integer |
| 7 | Remote Held Status | Whether the call has been held by the remote party. | True, False | Boolean |
| 8 | DTMF Tones | Control characters to be sent. | 0-9, *, #, A-D | String |
| 9 | Currently available calling features | This may be a dynamically updated set of flags, for example. | TBD | Bitfield |
| 10 | Audio Mute State | State of the mute flag for a given call. | True, False | Boolean |
| 11 | Ringer State | State of the ringer. | Silent, Normal | Unsigned Integer |
| 12 | Outgoing Call Service Provider | Default service provider (SIP or Skype or 3G or . . .) for outgoing call | N/A | String |
| 13 | Supported Codec list | Supported Audio Codec list with preference order | N/A | String |
| 14 | Reference Codec | User selected codec | N/A | String |

Thereafter, the smart phone performs a (VoIP) call connection procedure along with the remote device at step S720.

The call connection procedure includes an audio codec negotiation procedure for determining, by the smart phone and the remote device, which audio codec will be used in order to send or receive an audio stream.

The audio codec negotiation procedure may include (1) notifying, by the smart phone, the remote device of information about an audio codec supported by the Bluetooth headset, (2) receiving a response to (1) from the remote device, and (3) sending, by the smart phone, a response to (2) to the Bluetooth headset.

At step (3), a result of an audio codec negotiation between the smart phone and the remote device may be included.

The response to (1) may include information providing notification that audio streams will be transmitted and received between the smart phone and the remote device using an audio codec supported by the Bluetooth headset.

From FIG. 7, it may be seen that the smart phone and the remote device have negotiated to use an audio codec type C in order to send or receive an audio stream between.

Furthermore, (VoIP) call connection between the smart phone and the remote device may be performed using 3G/4G mobile communication or Wi-Fi wireless communication. An application for the VoIP call connection may include Skype, KaKao Talk, Google talk, and Facetime.

After step S720, a procedure of receiving, by the Bluetooth headset, an audio stream from the remote device and a procedure for sending, by the Bluetooth headset, an audio stream to the remote device are described below.

First, a procedure of receiving, by the Bluetooth headset, an audio stream from the remote device is described.

The remote device sends an audio stream, encoded into the audio stream of the audio codec negotiated at step S720, to the smart phone.

The smart phone checks whether the received audio stream is an audio codec supported by the Bluetooth headset at step S710.

The smart phone operates in (1) bypass mode or (2) conversion mode based on a result of the check.

Bypass mode refers to mode in which the smart phone directly sends an audio stream, received from the remote device, to the Bluetooth headset without converting (encoding/decoding) the audio stream into the audio stream of an audio codec.

Furthermore, conversion mode refers to mode in which the smart phone converts an audio stream, received from the remote device, into the audio stream of an audio codec supported by the Bluetooth headset and sends the converted audio stream to the Bluetooth headset.

That is, the smart phone operates in bypass mode if an audio stream received from the remote device corresponds to the audio stream of an audio codec supported by the Bluetooth headset.

Alternatively, the smart phone operates in conversion mode if an audio stream received from the remote device does not correspond to the audio stream of an audio codec supported by the Bluetooth headset.

In FIG. 7, the smart phone operates in bypass mode because the audio codec type (codec type C) of the audio stream received from the remote device is not identical with one of codec types (i.e., codec types A, B, and C) supported by the Bluetooth headset.

A procedure of sending, by the Bluetooth headset, an audio stream to the remote device is described below.

The remote device sends an audio stream to the smart phone through the audio codec set at step S710.

The smart phone checks whether the received audio stream corresponds to the audio stream of an audio codec negotiated with the remote device at step S720.

The smart phone operates in (1) bypass mode or (2) conversion mode based on a result of the check.

In this case, bypass mode refers to mode in which an audio stream received from the Bluetooth headset is directly sent to the remote device without converting the audio stream into the audio stream of an audio codec.

Furthermore, conversion mode refers to mode in which an audio stream received from the Bluetooth headset is converted into the audio stream of an audio codec negotiated with the remote device and an audio stream corresponding to the converted audio codec is sent to the remote device.

That is, if an audio stream received from the Bluetooth headset corresponds to the audio stream of an audio codec negotiated with the remote device, the smart phone operates in bypass mode. If an audio stream received from the Bluetooth headset does not correspond to the audio stream of an audio codec negotiated with the remote device, the smart phone operates in conversion mode.

From FIG. 7, it may be seen that the smart phone operates in bypass mode because an codec type (codec type C) applied to the audio stream received from the Bluetooth headset corresponds to a codec type (codec type C) negotiated with the remote device.

The method of FIG. 7 can improve performance and energy efficiency of a smart phone because a procedure for encoding/decoding an audio stream, which is unnecessary in a smart phone, is removed.

That is, there are advantages in that 1) end to end delay and 2) energy or resource consumption in a smart phone can be reduced.

Figure 8:
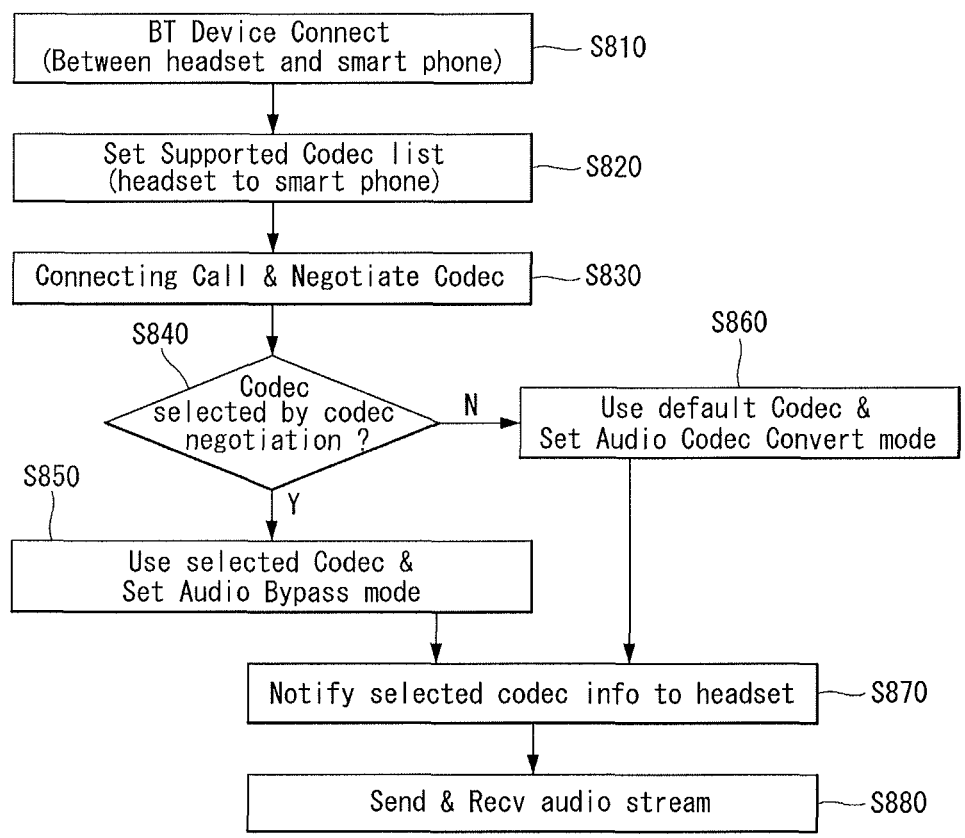
FIG. 8 is a flowchart illustrating an example of a method for setting reference codec information and transmitting and receiving audio streams, which is proposed in this specification.

FIG. 8 is a flowchart illustrating an example of a method for setting reference codec information and transmitting and receiving audio streams, which is proposed in this specification.

First, a Bluetooth headset and a smart phone perform a Bluetooth connection procedure at step S810.

Bluetooth connection may be performed through BLE.

In this case, the GATT-based profile of BLE includes a newly defined call control service.

Thereafter, the Bluetooth headset sends reference codec information to the smart phone at step S820.

The reference codec information may be information indicative of a list of audio codecs supportable by the Bluetooth headset.

Thereafter, the smart phone, together with the remote device, performs a call connection procedure and an audio codec negotiation procedure at step S830.

The audio codec negotiation procedure may be performed during the call connection procedure.

The smart phone may notify the remote device of the type of audio codecs supportable by the Bluetooth headset, that is, the reference codec information, through the call connection procedure.

Thereafter, when an audio stream is received from the remote device, the smart phone checks whether the received audio stream is the audio stream of an audio codec supported by the Bluetooth headset at step S840.

If, as a result of the check, the audio stream received from the remote device is found to be the audio stream of an audio codec supported by the Bluetooth headset, the smart phone operates in bypass mode at step S850.

If, as a result of the check, the audio stream received from the remote device is found to be not the audio stream of an audio codec supported by the Bluetooth headset, the smart phone operates in conversion mode at step S860.

That is, if the smart phone operates in conversion mode, the smart phone decodes the audio stream received from the remote device through the procedure of FIG. 6, converts the decoded audio stream into the audio stream of an audio codec supported by the Bluetooth headset, and sends the converted audio stream to the Bluetooth headset.

If the smart phone is determined to operate in bypass mode or conversion mode, the smart phone may notify the Bluetooth headset of the type of audio codec determined (or selected) through an audio codec negotiation procedure with the remote device at step S870.

Thereafter, the smart phone sends the audio stream, received from the remote device, to the Bluetooth headset according to bypass mode or conversion mode at step S880.

Figure 9:
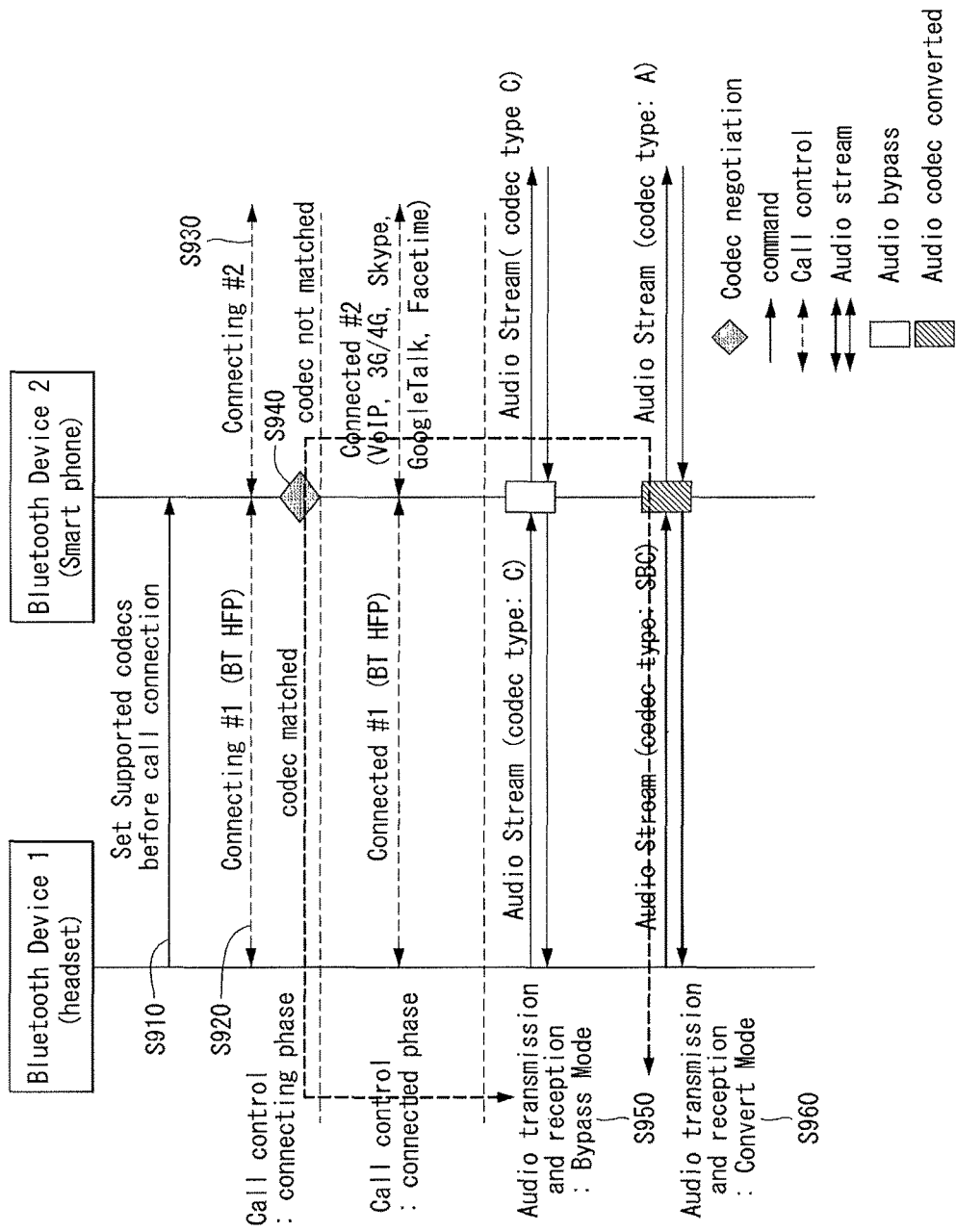
FIG. 9 is a flowchart illustrating an example of a method for setting reference codec information and transmitting and receiving audio streams, which is proposed in this specification.

FIG. 9 is a flowchart illustrating an example of a method for setting reference codec information and transmitting and receiving audio streams, which is proposed in this specification.

First, a Bluetooth headset sends set reference codec information to a smart phone at step S910.

The reference codec information is indicative of the type of audio codec supportable by the Bluetooth headset and may be set by a user.

The reference codec information is transmitted prior to a call connection procedure between the smart phone and the remote device.

A criterion for determining the reference codec information may be selected by a Bluetooth headset manufacturer.

The reference codec information may be included in an INVITE message of messages exchanged in a session initiation protocol (SIP) procedure.

Furthermore, as described above, the transmission and reception of the reference codec information may be performed through the advertising procedure or scanning procedure of BLE.

Thereafter, the Bluetooth headset performs a Bluetooth connection procedure along with the smart phone for a call control service at step S920.

Furthermore, the smart phone, together with the remote device, a call connection procedure at step S930.

Thereafter, the smart phone checks whether an audio codec negotiated with the remote device through an audio codec negotiation procedure is identical with an audio codec supported by the Bluetooth headset at step S940.

Step S940 may be performed when the smart phone receives an audio stream from the remote device or the Bluetooth headset or before the smart phone receives an audio stream from the remote device or the Bluetooth headset.

The audio codec negotiation procedure may include a procedure for comparing information about a codec supported by the Bluetooth headset with information about a codec supported by the remote device and determining codec information supported by the Bluetooth headset if the codec information is included in pieces of codec information supported by the remote device.

The smart phone may send information that requests the remote device to send a codec used in an audio stream through a codec supported by the Bluetooth headset to the remote device through the audio codec negotiation procedure.

In this case, the audio codec negotiation procedure may be divided into a process of sending, by the smart phone, a request message to the remote device and a process of receiving, by the smart phone, a response message for the request message from the remote device.

The remote device may send a result of the execution of the audio codec negotiation procedure to the smart phone through the OK 200 message of an SIP.

That is, the smart phone may check whether information about a codec supported by the Bluetooth headset is identical with codec information included in the audio stream transmitted by the remote device through the OK 200 message.

If, as a result of the check, the audio stream received from the remote device is found to be identical with the audio stream of the audio codec supported by the Bluetooth headset, the smart phone operates in bypass mode at step S950.

That is, the smart phone (1) forwards the audio stream, transmitted by the Bluetooth headset or received from the remote device, to the remote device or the Bluetooth headset without separately decoding/encoding the audio stream.

If, as a result of the check, the audio stream received from the remote device is found to be not identical with the audio stream of the audio codec supported by the Bluetooth headset, the smart phone operates in conversion mode at step S960.

That is, the smart phone (1) converts the audio stream transmitted by the Bluetooth headset into the audio stream of the audio codec supported by the remote device and sends the converted audio stream to the remote device and (2) converts the audio stream received from the remote device into the audio stream of the audio codec supported by the Bluetooth headset and sends the converted audio stream to the Bluetooth headset.

Furthermore, the drawings have been divided and described for convenience of description, but embodiments described with reference to the drawings may be merged to implement a new embodiment. Furthermore, the scope of the present invention also includes designing a computer-readable recording medium in which a program for executing the aforementioned embodiments has been written according to the needs of those skilled in the art.

The data transmission and reception methods using an isochronal channel according to this specification are not limited and applied to the configurations and methods of the aforementioned embodiments, but some or all of the embodiments may be selectively combined and configured so that the embodiments are modified in various ways.

The data transmission and reception methods using an isochronal channel according to this specification may be implemented in a recording medium, readable by a processor included in a network device, in the form of code readable by the processor. The processor-readable recording medium includes all types of recording devices in which data readable by a processor is stored. The recording medium may include ROM, RAM, CD-ROM, magnetic tapes, floppy disks, and optical data storages, for example. Furthermore, the processor-readable recording medium may be distributed over computer systems connected over a network, and the processor-readable code may be stored and executed in a distributed manner.

Furthermore, although some embodiments of this specification have been illustrated and described above, this specification is not limited to the aforementioned specific embodiments, and those skilled in the art to which the present invention pertains may modify the present invention in various ways without departing from the gist of the present invention written in the claims. Such modified embodiments should not be individually understood from the technical spirit or prospect of the present invention.

Furthermore, in this specification, both the device invention and the method invention have been described, but the descriptions of both the inventions may be supplemented and applied, if necessary.

In this specification, a method for transmitting and receiving audio streams through the setting of reference codec information may be used.

What is claimed is:

1. A method of transceiving audio stream in a wireless communication system, the method performed by a first device comprising:
   receiving reference codec information from a second device, the reference codec information comprising audio codec type information indicating an audio codec type supported by the second device, the reference codec information being included in an advertising channel PDU (Packet Data Unit) or a data channel PDU;
   performing an audio codec negotiation procedure for determining an audio codec type to be used to transceive the audio stream to and from a third device;
   checking whether the audio codec type determined through the audio codec negotiation procedure is identical with the audio codec type supported by the second device; and
   operating in bypass mode or conversion mode based on a result of the check,
   wherein the bypass mode or the conversion mode is determined according to whether or not an audio codec conversion of the audio stream is performed.

2. The method of claim 1, further comprising performing a Bluetooth connection procedure along with the second device for a call control service.

3. The method of claim 2, wherein the call control service is defined by a GATT-based profile.

4. The method of claim 1, wherein the reference codec information is received through an advertising procedure or scanning procedure of Bluetooth low energy (BLE).

5. The method of claim 1, wherein the reference codec information comprises at least one of information indicative of a service provider for an outgoing call, an audio codec list indicative of supportable audio codecs, or information indicative of an audio codec selected by a user.

6. The method of claim 5, wherein the audio codec list has preference order.

7. The method of claim 1, further comprising performing a call connection procedure along with the third device, wherein the audio codec negotiation procedure is performed through the call connection procedure.

8. The method of claim 1, wherein the audio codec negotiation procedure comprises transmitting the reference codec information received from the second device to the third device.

9. The method of claim 1, wherein operating in the bypass mode comprises:
   receiving an audio stream from the second device; and
   forwarding the received audio stream to the third device.

10. The method of claim 1, wherein operating in the bypass mode comprises:
    receiving an audio stream from the third device; and
    forwarding the received audio stream to the second device.

11. The method of claim 1, wherein operating in the conversion mode comprises:
    receiving an audio stream from the second device;
    converting the received audio stream into an audio stream of the audio codec determined through the audio codec negotiation procedure; and
    transmitting the converted audio stream to the third device.

12. The method of claim 1, wherein operating in the conversion mode comprises:
    receiving an audio stream from the third device;
    converting the received audio stream into an audio stream of the audio codec supportable by the second device; and
    transmitting the converted audio stream to the second device.

13. The method of claim 1, wherein:
    the second device comprises a Bluetooth headset, and
    the third device comprises a remote device.

14. The method of claim 1, wherein the reference codec information is included in an invite message of a session initiation protocol (SIP).

15. The method of claim 1, wherein the information related to the audio codec determined through the audio codec negotiation procedure is included in an OK 200 message of a session initiation protocol (SIP).

16. A first device for transceiving audio stream in a wireless communication system, the first device comprising:
    a communication unit configured to perform communication in a wireless or wired manner; and
    a processor functionally connected to the communication unit, wherein the processor performs control the first device to:
    receive reference codec information from a second device, the reference codec information comprising audio codec type information indicating an audio codec type supported by the second device, the reference codec information being included in an advertising channel PDU (Packet Data Unit) or a data channel PDU;

perform an audio codec negotiation procedure for determining an audio codec type to be used to transceive the audio stream to and from a third device;

check whether the audio codec type determined through the audio codec negotiation procedure is identical with the audio codec type supported by the second device; and operate in bypass mode or conversion mode based on a result of the check, wherein the bypass mode or the conversion mode is determined according to whether or not an audio codec conversion of the audio stream is performed.

* * * * *